US011913504B2

(12) United States Patent
Young et al.

(10) Patent No.: US 11,913,504 B2
(45) Date of Patent: Feb. 27, 2024

(54) CLUTCH WEIGHT FOR CONTINUOUSLY VARIABLE TRANSMISSION

(71) Applicant: Boondocker LLC, Idaho Falls, ID (US)

(72) Inventors: Rocklund D. Young, Idaho Falls, ID (US); Rocklund D. Young, Jr., Idaho Falls, ID (US)

(73) Assignee: Boondocker LLC, Idaho Falls, ID (US)

( * ) Notice: Subject to any disclaimer, the term of this patent is extended or adjusted under 35 U.S.C. 154(b) by 0 days.

(21) Appl. No.: 18/315,051

(22) Filed: May 10, 2023

(65) Prior Publication Data

US 2023/0272827 A1    Aug. 31, 2023

Related U.S. Application Data

(63) Continuation-in-part of application No. 17/557,000, filed on Dec. 20, 2021, now Pat. No. 11,668,356.

(60) Provisional application No. 63/128,099, filed on Dec. 19, 2020.

(51) Int. Cl.
*F16D 43/06*    (2006.01)
*F16H 55/56*    (2006.01)

(52) U.S. Cl.
CPC ............ *F16D 43/06* (2013.01); *F16H 55/563* (2013.01)

(58) Field of Classification Search
CPC .... F16D 43/06; F16D 43/14; F16D 2043/145; F16H 55/563
See application file for complete search history.

(56) References Cited

U.S. PATENT DOCUMENTS

| | | | |
|---|---|---|---|
| 3,727,478 A | 4/1973 | Erickson et al. | |
| 5,326,330 A | 7/1994 | Bostelmann | |
| 6,149,540 A | 11/2000 | Johnson et al. | |
| 6,346,056 B1 | 2/2002 | Nouis et al. | |
| 9,267,580 B2 * | 2/2016 | Aitcin | F16H 63/067 |
| 9,644,717 B2 | 2/2017 | Aitcin | |
| 2006/0254874 A1 * | 11/2006 | Fox | F16D 43/12 |
| | | | 192/105 C |
| 2022/0049767 A1 | 2/2022 | Roberts | |

* cited by examiner

*Primary Examiner* — Huan Le
(74) *Attorney, Agent, or Firm* — Kunzler Bean & Adamson

(57) ABSTRACT

A clutch weight for a continuously variable transmission is disclosed. The clutch weight, in certain examples, includes a body having a first end having a pivot pin opening and a second end opposite the first end, a curvilinear surface disposed between the first end and the second end configured to engage a roller, and wherein the roller contacts the curvilinear surface at least at a first contact position, and a center of mass of the body disposed a distance Y from a center of the pivot pin opening and a distance X from the first contact position, and where a ratio of X to Y is in the range of between about 0.499 and 0.685.

15 Claims, 7 Drawing Sheets

CLUTCH WEIGHT FOR CONTINUOUSLY VARIABLE TRANSMISSION

CROSS-REFERENCES TO RELATED APPLICATIONS

This is a continuation-in-part application and claims priority to U.S. patent application Ser. No. 17/557,000 entitled "CLUTCH WEIGHT FOR CONTINUOUSLY VARIABLE TRANSMISSION" and filed on Dec. 20, 2021 for Rocklund D. Young et al., and this application also claims the benefit of U.S. Provisional Patent Application No. 63/128,099 entitled "CLUTCH WEIGHT FOR CONTINUOUSLY VARIABLE TRANSMISSION" and filed on Dec. 19, 2020 for Rocklund D. Young et al., both of which are incorporated herein by reference.

FIELD

This invention relates to continuously variable transmissions, and more particularly relates to adjustable clutch weights for continuously variable transmissions.

BACKGROUND

Various types of vehicles, including snowmobiles, utility terrain vehicles, all-terrain vehicles, etc., utilize continuously variable transmissions to transfer power from an output shaft of an engine to a driven shaft. Such continuously variable transmissions (CVTs) use a split moveable sheave primary drive clutch connected to the output of the engine and a split moveable sheave secondary clutch connected to the driven shaft. A flexible belt typically couples the primary clutch to the secondary clutch. The gear ratio of the CVT is determined by the positions of the movable sheaves of the primary and secondary clutches. RPM sensitive clutch weights control the distance between the clutch sheaves of the primary clutch. As the rotational speed of the primary clutch increases, the clutch weights rotate and push against rollers to close the distance between the clutch sheaves. The operating performance of the CVT can be greatly affected by the clutch weights. Unfortunately, modifying the performance characteristics of common clutch weights requires wholesale replacement of the clutch weights.

SUMMARY

An apparatus for a continuously variable transmission is disclosed. A clutch and a vehicle implementing the apparatus are also disclosed. The apparatus, in certain examples is an adjustable clutch weight that is optimized for the positioning of the center of mass. The clutch weight, in certain examples, includes body having a first end having a pivot pin opening and a second end opposite the first end, a curvilinear surface disposed between the first end and the second end configured to engage a roller, and wherein the roller contacts the curvilinear surface at least at a first contact position, and a center of mass of the body disposed a distance Y from a center of the pivot pin opening and a distance X from the first contact position, and where a ratio of X to Y is in the range of between about 0.499 and 0.519.

In certain examples, the clutch weight includes an extended portion positioned opposite the curvilinear surface and adjacent the second end. The extended portion forms a cutout portion having a peak. The center of mass, in certain examples, is disposed adjacent the peak. The extended portion may extend away from the curvilinear surface past an axis defined by the center of the pivot pin opening and the second end of the body.

In certain examples, the clutch weight includes a bore extending from the first end to the second end and having a capsule opening disposed in the first end adjacent the pivot pin opening. The capsule opening may include threads for mating with a capsule. In certain examples, the capsule is formed of a head portion, a threaded portion, and one or more weighted portions forming an elongated member. The capsule is insertable into the bore and the threaded portion of the capsule mates with the threads of the opening to secure the capsule within the clutch weight.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
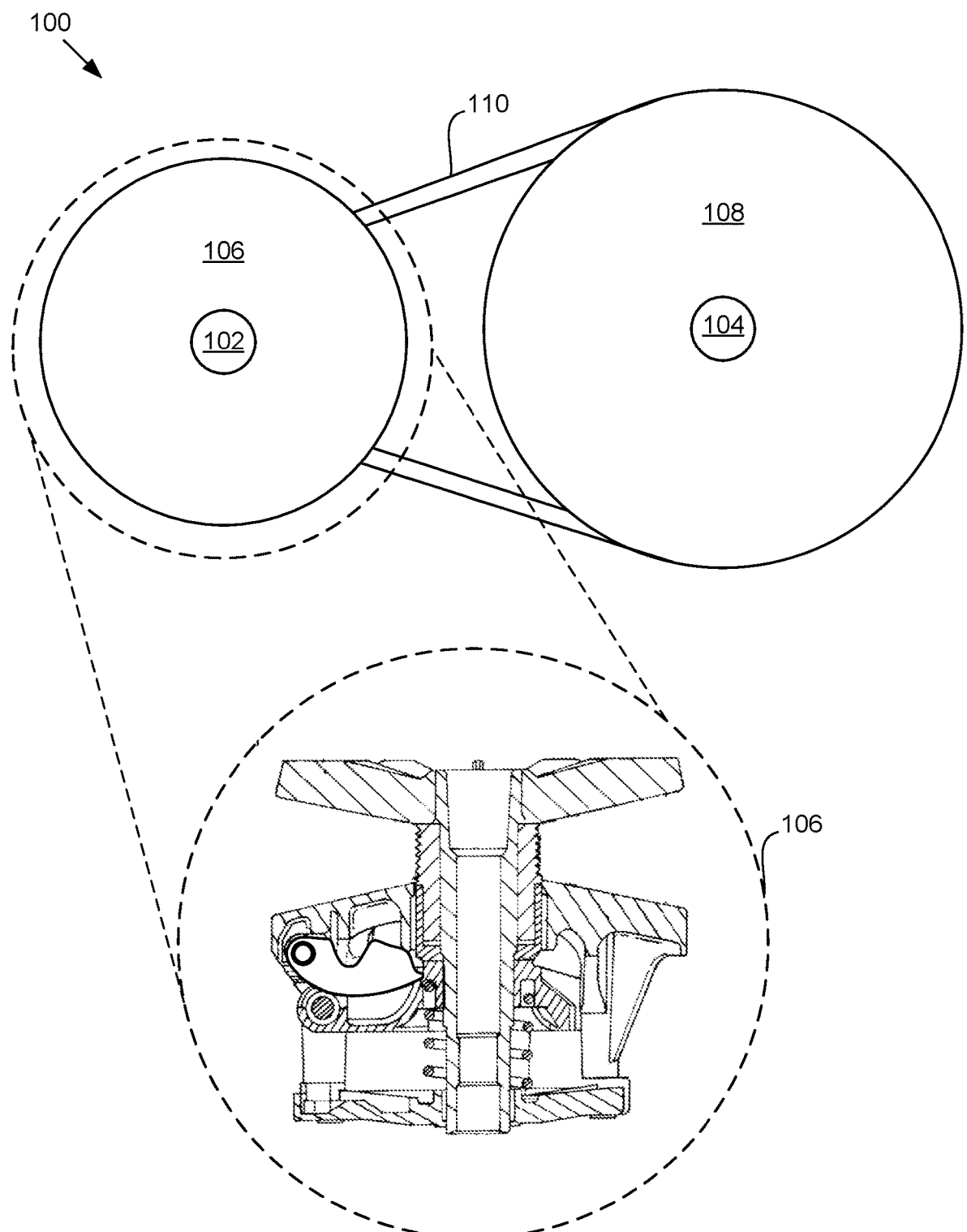
FIG. 1 is a schematic block diagram illustrating a simplified view of a continuously variable transmission (CVT), according to examples of the subject disclosure.

Disclosed below is an apparatus, system, and/or method for an improved clutch weight for a continuously variable transmission, such as those found in snowmobiles and other vehicles. While the apparatus, system, and/or method is described below with reference to a snowmobile, it is contemplated that the clutch weight is adaptable to other continuously variable transmissions.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the examples of the disclosure may be practiced without one or more of the specific details, or with other methods, components, materials, and so forth. In other instances, well-known structures, materials, or operations are not shown or described in detail to avoid obscuring aspects of the disclosure.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating a simplified view of a continuously variable transmission (CVT) 100, according to examples of the subject disclosure. In certain examples, the CVT 100 is connect to an output shaft 102 of an engine and the CVT 100 provides a continuously variable gear reduction from the output shaft 102 to a drive axle 104 of the vehicle. The drive axle 104, in certain examples, connects to a continuous track of a snowmobile.

As known to those of skill in the art, the CVT 100 includes a split sheave primary drive clutch 106 connected to the output shaft 102 and a split sheave secondary clutch 108 connected to the drive axle 104. A belt 110 rotationally couples the primary clutch 106 to the secondary clutch 108. The belt 110, in certain examples, is a flexible, endless, generally V-shaped belt. In each of the primary clutch 106 and the secondary clutch 108, one of the pair of sheaves is laterally movable with respect to the other. Stated differently, the sheaves are movable along an axis defined by either the output shaft 102 or the drive axle 104.

FIG. 1 also depicts a call-out section view of the primary clutch 106, according to examples of the subject disclosure. The section view is taken along an axis defined by the output shaft 102 of the engine (not show here). The primary clutch 106 will be described in greater detail with reference to FIG. 2 below.

Figure 2:
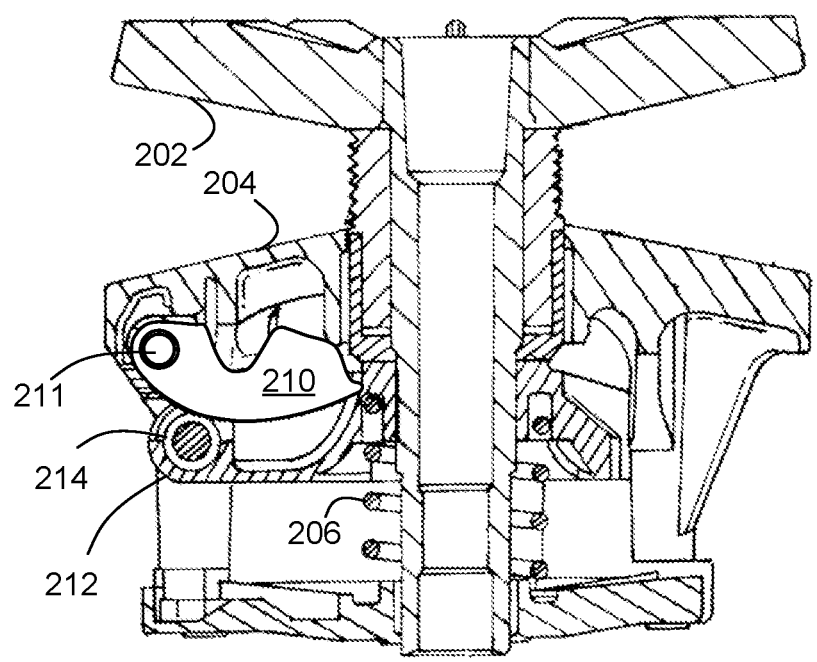
FIG. 2 is a section view diagram of a primary clutch in accordance with examples of the subject disclosure.

FIG. 2 is a section view diagram of a primary clutch 106 in accordance with examples of the subject disclosure. The gear ratio of the CVT 100 is determined by the positions of the movable sheaves with respect to each other. In a default position, the sheaves 202, 204 of the primary clutch 106 are biased apart by a coil spring 206 so that at engine idle speeds the drive belt 110 does not engage the sheaves 202, 204. Conversely, the sheaves of the secondary clutch (not shown) are normally biased together so that at engine idle speeds the drive belt 110 is positioned near an outer perimeter of the secondary clutch.

The lateral distance between the sheaves 202, 204 is controlled by a plurality of clutch weights 210. As the primary clutch 106 rotates faster (i.e., the engine speed increases) the clutch weights 210 urge the movable sheave 204 towards the stationary sheave 202, and cause the sheaves 202, 204 to clamp onto the drive belt 110 which causes the rotation of the secondary clutch 108, which in turn rotates the drive axle 104.

Also, the movement of the movable sheave 204 towards the stationary sheave 202 causes the belt 110 to climb towards the outer perimeter of the primary clutch which changes an effective gear ratio of the CVT 100. As the rotational speed of the primary clutch 106 increases, the clutch weights 210 rotate outward (in the depicted embodiment, rotating downward about a pivot pin 211) and push against the rollers 214 of the spider 212. In the depicted embodiment, the clutch weight 210 and roller 214 are in a first position. The first position may be a "home" position when the engine is off, or in an alternative, when the engine is idling and the drive belt 110 is not engaged. This generates a force that overcomes the coil spring 206 and moves the movable sheave 204 towards the stationary sheave 202. The shape of the clutch weight 210 can be altered to affect the belt engagement characteristics of the CVT 100. The shape and weight of the clutch weight 210 can modify the speed of engagement of the belt 110 and alter a shift curve of the vehicle. As snowmobiles and other vehicles are very diverse, with different engines, vehicle sizes, vehicle weights, great effort is spent to determine an ideal shape and weight of the clutch weight 210 for each vehicle. Beneficially, however, the clutch weight 210 of the subject application is adaptable to create different shift and engagement characteristics of the CVT 100.

In certain embodiments, as will be described in greater detail below, the clutch weight 210 is modifiable with different insertable weights. Additionally, a new geometry as depicted positions a center of mass positioned adjacent a peak of a cutout portion.

Figure 3A:
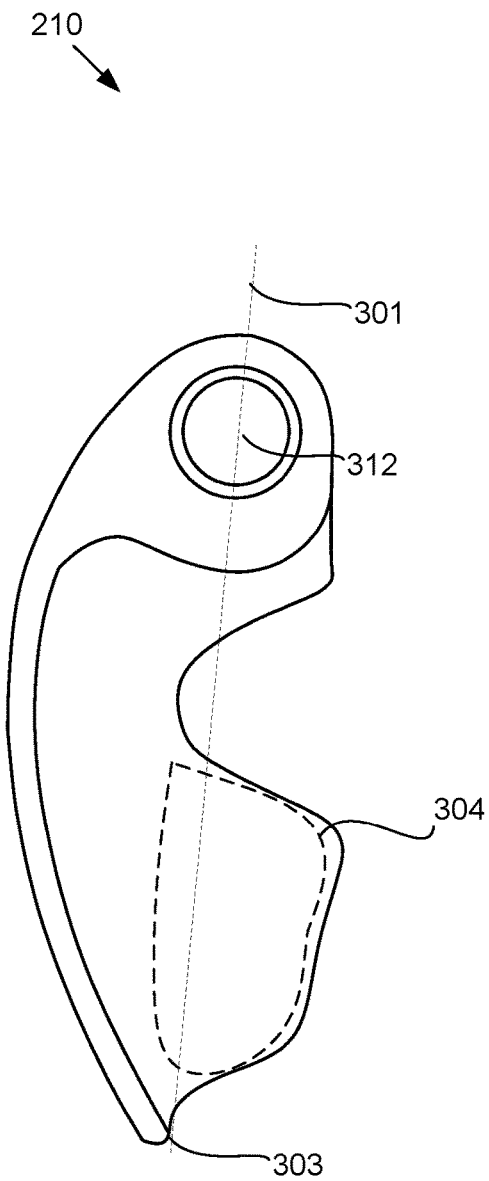
FIG. 3A is a side view diagram of a clutch weight, according to examples of the subject disclosure.

FIG. 3A is a side view diagram of a clutch weight 210, according to examples of the subject disclosure. The depicted example illustrates an extended portion 304 extending away from the curvilinear surface past an axis 301 that is defined by a center 312 of a pivot pin opening and a second end 303 of the clutch weight.

Figure 3B:
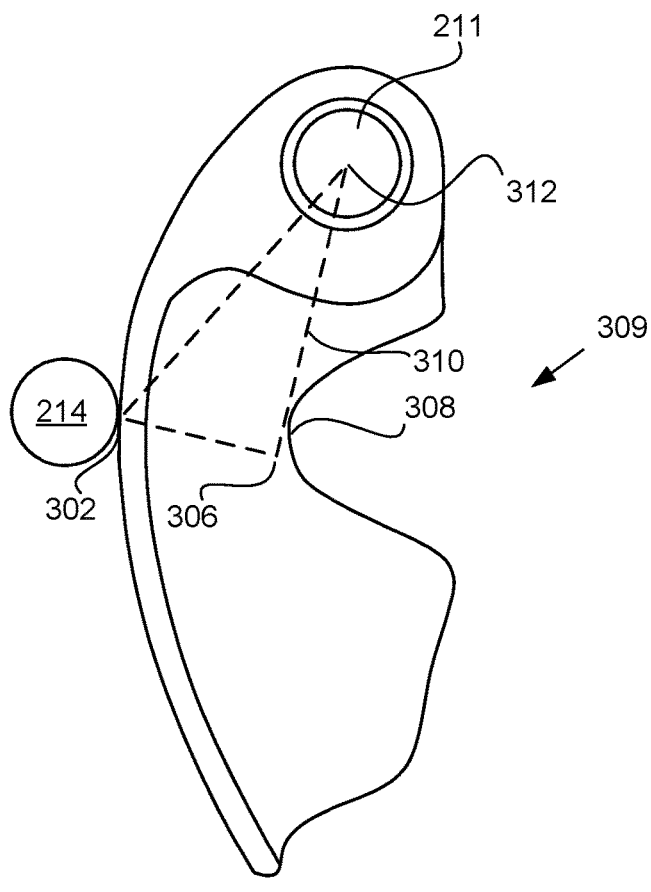
FIG. 3B is a side view diagram of a clutch weight, according to examples of the subject disclosure.

FIG. 3B is a side view diagram of a clutch weight 210, according to examples of the subject disclosure. The clutch weight 210, in certain examples, includes a roller engagement surface 302 that generally forms a convex curvilinear surface configured to engage the roller 214. The roller 214, in a default or first position, as depicted, contacts the clutch weight 210 at a first contact point 302. The first contact point 302, in certain embodiments, is the position of the roller 214 when engine is not running. In other embodiments, the first contact point 302 is the position of the roller 214 when the engine is idling and the drive belt 110 is not engaged.

The clutch weight 210 of the subject disclosure is provided with an extended portion that is generally identified by the dotted box 304. This extended portion 304 is beneficial to position a center of mass 306 towards a surface that is opposite the roller engagement surface. In the depicted embodiment, the center of mass 306 is positioned adjacent a peak 308 of a cutout area 309 of the clutch weight 210.

The center of mass 306, in certain examples, is positioned at a vertex of a substantially right triangle 310 that is defined by a center 312 of the pivot pin 211 and the first contact point 302. In alternative examples, the triangle 310 is not a right triangle. In certain examples, a distance Y (see FIG. 4) between the center 312 of the pivot pin 211 and the center of mass 306 is in the range of between about 0.790 and 0.90 inches. A distance X (see FIG. 4) between the center of mass 306 and the first contact point 302 is in the range of between about 0.450 and 0.480 inches. In certain examples, the distance Y is in the range of between about 0.814 and 0.899 inches, and the distance X is in the range of between about 0.453 and 0.475 inches.

Figure 4A:
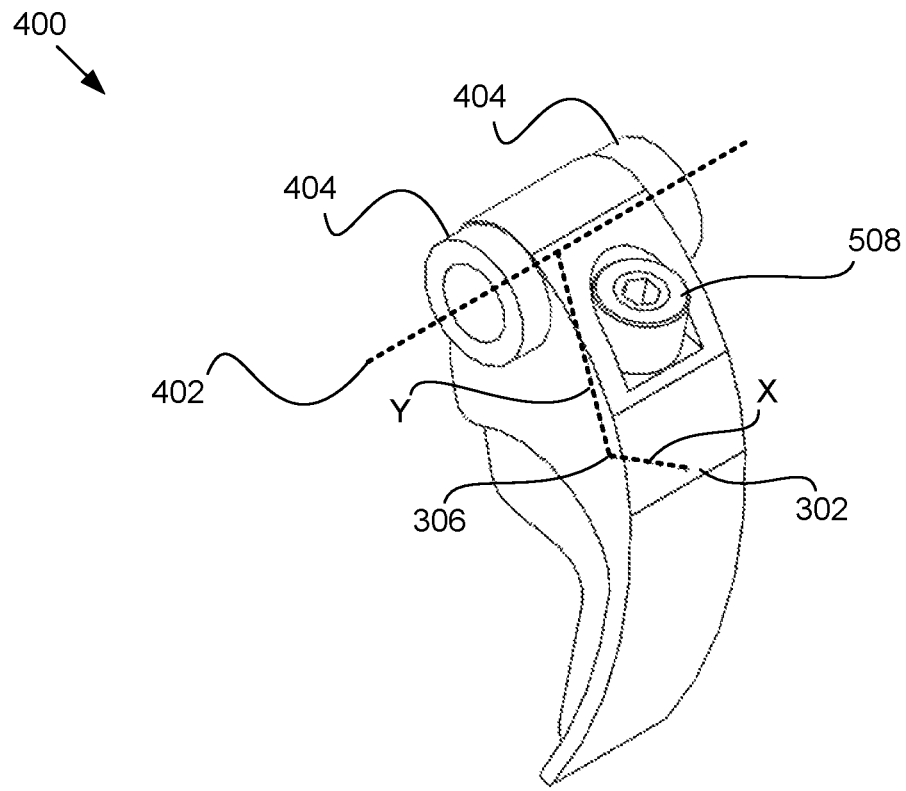
FIG. 4A is a perspective view diagram of a clutch weight, according to examples of the subject disclosure.

FIG. 4A is a side view diagram of a clutch weight 400, according to examples of the subject disclosure. In certain examples, the clutch weight 400 is provided without the extended portion. Dotted line 402 depicts an axis that is defined by the center 312 of the pivot pin 211. The clutch weight 400 rotates about the dotted line 402 within the clutch. For fitment purposes, shoulders 404 may be formed with the clutch weight 400 to properly position the clutch weight 400 within the clutch. The shoulders 404 may be formed of various different shapes and from various different materials with different densities.

In determining the center of mass 306, in certain examples, if the shoulders 404 are excluded from the determination, the distance X may be in the range of between about 0.401 and 0.415 inches. The distance Y may be in the range of between about 0.772 and 0.831 inches. The resulting ratio of X/Y may be in the range of between about 0.499 and 0.519.

If, however, the shoulders 404 are included in the determination of the center of mass position 306, the distance X may be in the range of between about 0.425 and 0.447 inches. The distance Y may be in the range of between about 0.622 and 0.660 inches. The ratio of X/Y, in this example, is in the range of between about 0.665 and 0.685. FIG. 4A also depicts an insertable capsule 508 (see FIG. 5).

The center of mass 306, in the depicted example, is positioned at a vertex of a substantially right triangle 310 that is defined by a center 402 of the pivot pin 211 and the first contact point 302.

Figure 4B:
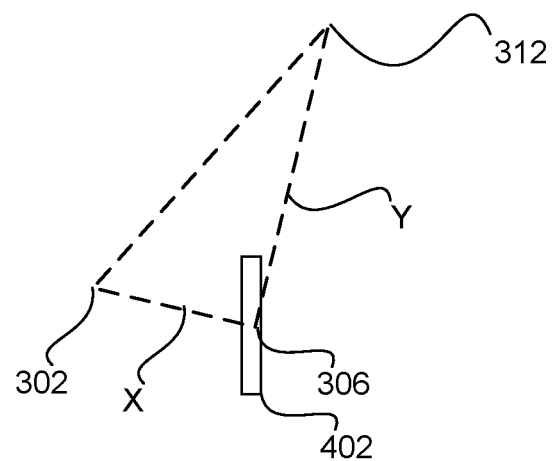
FIG. 4B is a block diagram illustrating one embodiment of the spatial relationship of the center of mass, according to examples of the subject disclosure.

FIG. 4B is a block diagram illustrating one embodiment of the spatial relationship of the center of mass 306, according to examples of the subject disclosure. As described above, the center of mass 306 is adjustable within an area generally defined by the window 402. More specifically, the center of mass 306 is positioned a distance Y from the center 312 of the pivot pin 211, and a distance X from the first contact point 302. A ratio of X to Y, in certain examples, is between about 0.520 and 0.560. In certain other examples, the ratio of X to Y is in the range of between about 0.526 and 0.558. Although depicted here as a right triangle, it is contemplated that the position of the center of mass may form any triangle with the center 312 of the pivot pin 211 and the first contact point 302.

Figure 5:
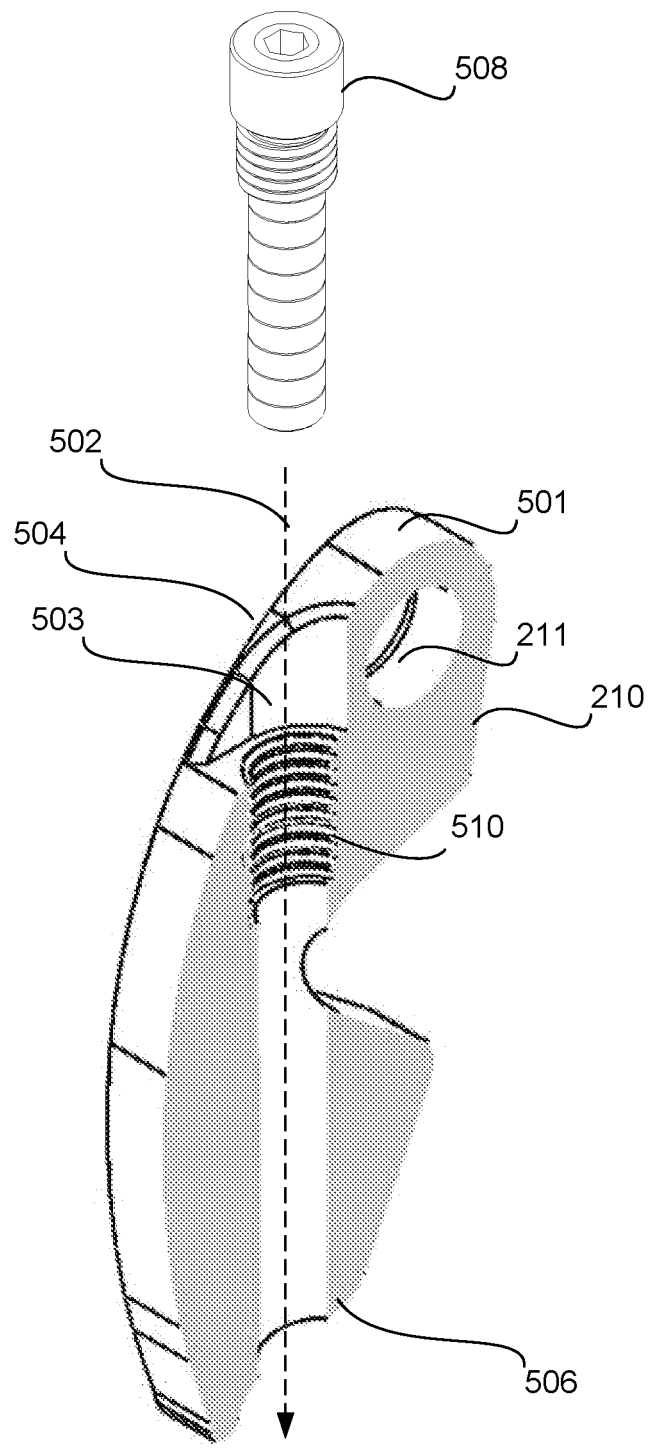
FIG. 5 is a perspective view diagram of a cross-section of the clutch weight, in accordance with examples of the subject disclosure.
Figure 6A:
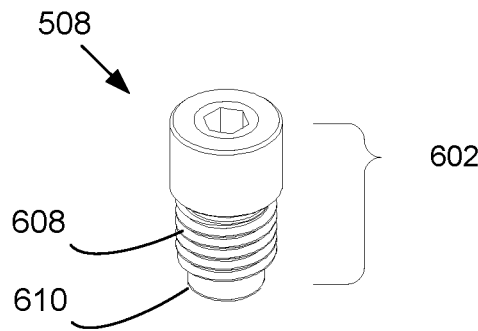
FIGS. 6A-6D are perspective view diagrams illustrating examples of capsules suitable for use with the clutch weight, according to examples of the subject disclosure.
Figure 6B:
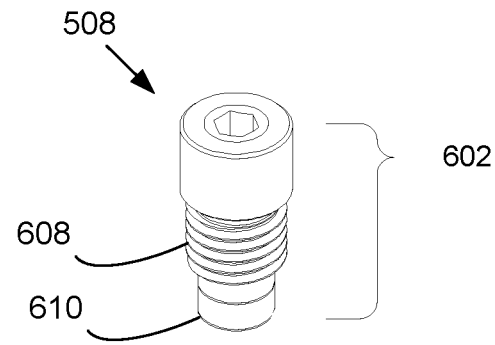
Figure 6C:
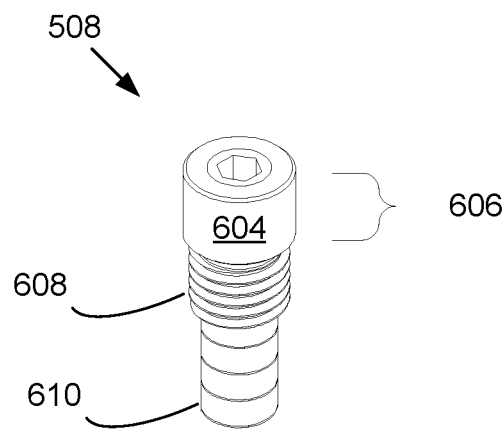
Figure 6D:
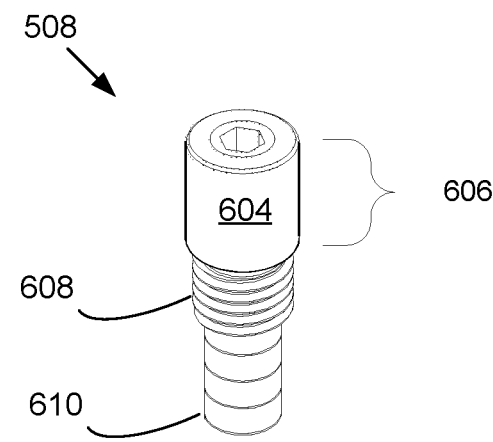

FIG. 5 is a perspective view diagram of a cross-section of the clutch weight 210, in accordance with examples of the subject disclosure. In certain examples, the clutch weight 210 includes a lengthwise bore (identified by axis 502), having a capsule opening 503, that extends from a first end 504 towards a second end 506. The first end 501 is adjacent an opening for the pivot pin 211 and the opening for an insertable capsule 508 may be threaded 510. The lengthwise bore is configured to receive the insertable capsule 508 or rod. This beneficially allows a person to alter the clutch engagement characteristics of the primary clutch. The capsule 508 may be of varying lengths or densities to alter the center of mass of the clutch weight 210, which alters the centrifugal force required to engage the belt of the CVT. The capsule 508 will be described in greater detail below with reference to FIGS. 6a-6d.

FIGS. 6A-6D are perspective view diagrams illustrating examples of capsules 508 suitable for use with the clutch weight 210, according to examples of the subject disclosure. The FIGS. 6a-6d each illustrate an example of a capsule 508 that may be inserted into the bore of the clutch weight 210. Capsules 508 may be of varying overall lengths 602. Additionally, a head 604 of a capsule 508 may be of a varying length 606, for example, the head 604 may have a length greater than the threaded portion. In the alternative, the head may have a length less than or equal to the threaded portion. Such adjustability beneficially allows for the fine tuning of the placement of the center of mass.

Disposed adjacent the head 604, in certain examples, is a threaded portion 608 for mating with the threads of the clutch weight 210 (see FIG. 5). The threaded portion 608 allows for the capsule 508 to engage with and be securely seated inside the clutch weight 210. Disposed adjacent the threaded portion 608, in certain examples, is one or more weighted portions 610. The weighted portions 610 may be of any length. Additionally, each capsule 508 may include one or more weighted portions 610. The capsules 508 may be formed of any rigid material that is suitable for the high RPM environment of a CVT system. The rigid materials may be polymers, metals, and/or metal alloys. The density of the material may be selected to obtain a desired center of mass positioning as described in FIGS. 3 and 4.

Figure 7:
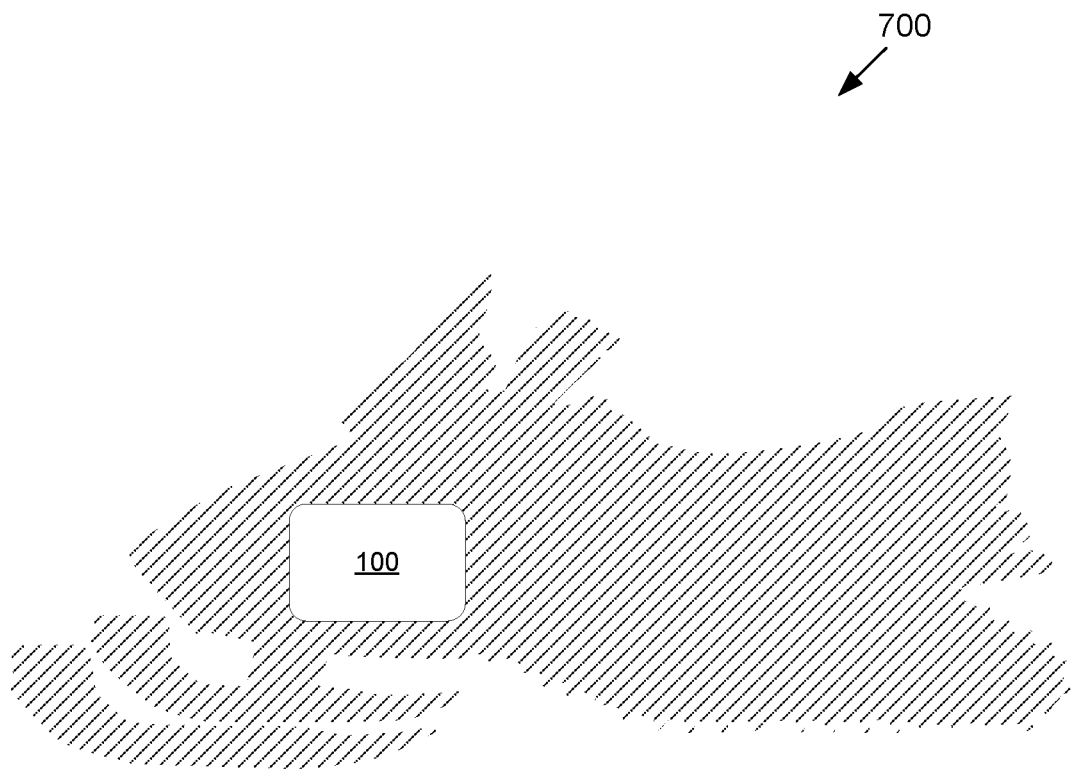
FIG. 7 is a block diagram illustrating one example of a vehicle suitable for use with the CVT, according to examples of the subject disclosure.

FIG. 7 is a block diagram illustrating one example of a vehicle 700 suitable for use with the CVT 100, according to examples of the subject disclosure. The vehicle, as depicted, is a snowmobile. In other examples, the vehicle may be an all-terrain vehicle or utility terrain vehicle.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A clutch weight for a continuously variable transmission, the clutch weight comprising:
   a body having a first end having a pivot pin opening and a second end opposite the first end;
   a curvilinear surface disposed between the first end and the second end configured to engage a roller, and wherein the roller contacts the curvilinear surface at least at a first contact position; and
   a center of mass of the body determined, when excluding a mass of a shoulder, to be disposed a distance Y from a center of the pivot pin opening and a distance X from the first contact position, and where a ratio of X to Y is in a range of between about 0.499 and 0.519.

2. The clutch weight of claim 1, further comprising a bore extending from the first end to the second end and having a capsule opening disposed in the first end adjacent the pivot pin opening.

3. The clutch weight of claim 2, further comprising threads formed in the capsule opening for mating with corresponding threads of a capsule.

4. The clutch weight of claim 3, wherein the capsule comprises a head portion, a threaded portion, and one or more weighted portions forming an elongated member.

5. The clutch weight of claim 4, wherein the capsule is insertable into the bore and the threaded portion of the capsule mates with the threads of the opening to secure the capsule within the clutch weight.

6. A clutch weight for a continuously variable transmission, the clutch weight comprising:
   a body having a first end having a pivot pin opening and a second end opposite the first end;
   a curvilinear surface disposed between the first end and the second end configured to engage a roller, and wherein the roller contacts the curvilinear surface at least at a first contact position; and
   a center of mass of the body determined, when excluding a mass of a shoulder, to be disposed a distance Y from a center of the pivot pin opening and a distance X from the first contact position, and where a ratio of X to Y is in a range of between about 0.665 and 0.685.

7. The clutch weight of claim 6, further comprising a bore extending from the first end to the second end and having a capsule opening disposed in the first end adjacent the pivot pin opening.

8. The clutch weight of claim 7, further comprising threads formed in the capsule opening for mating with corresponding threads of a capsule.

9. The clutch weight of claim 8, wherein the capsule comprises a head portion, a threaded portion, and one or more weighted portions forming an elongated member.

10. The clutch weight of claim 9, wherein the capsule is insertable into the bore and the threaded portion of the capsule mates with the threads of the opening to secure the capsule within the clutch weight.

11. A primary clutch of a continuously variable transmission, the primary clutch having an adjustable clutch weight comprising:
    a body having a first end having a pivot pin opening and a second end opposite the first end;
    a curvilinear surface disposed between the first end and the second end configured to engage a roller, and wherein the roller contacts the curvilinear surface at least at a first contact position; and
    a center of mass of the body determined, when including a mass of a shoulder, to be disposed a distance Y from a center of the pivot pin opening and a distance X from the first contact position, and where a ratio of X to Y is in a range of between about 0.665 and 0.685.

12. The primary clutch of claim 11, further comprising a bore extending from the first end to the second end and having a capsule opening disposed in the first end adjacent the pivot pin opening.

13. The primary clutch of claim 12, further comprising threads formed in the capsule opening for mating with corresponding threads of a capsule.

14. The primary clutch of claim 13, wherein the capsule comprises a head portion, a threaded portion, and one or more weighted portions forming an elongated member.

15. The primary clutch of claim 14, wherein the capsule is insertable into the bore and the threaded portion of the capsule mates with the threads of the opening to secure the capsule within the clutch weight.

* * * * *